United States Patent
Chang et al.

(10) Patent No.: US 11,730,145 B2
(45) Date of Patent: *Aug. 22, 2023

(54) REVERSIBLE PET HARNESS HAVING A CHEST RING

(71) Applicant: Sassy Woof LLC, Sterling, VA (US)

(72) Inventors: Christine N. Chang, Sterling, VA (US); Arturo Chang, Sterling, VA (US)

(73) Assignee: Sassy Woof LLC, Sterling, VA (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/380,510

(22) Filed: Jul. 20, 2021

(65) Prior Publication Data

US 2022/0248640 A1  Aug. 11, 2022

Related U.S. Application Data

(63) Continuation of application No. 17/215,578, filed on Mar. 29, 2021, now Pat. No. 11,102,958.

(60) Provisional application No. 63/146,938, filed on Feb. 8, 2021.

(51) Int. Cl.
*A01K 27/00* (2006.01)

(52) U.S. Cl.
CPC .................. *A01K 27/002* (2013.01)

(58) Field of Classification Search
CPC .. A01K 27/002; A01K 13/006; A01K 27/001; A01K 27/005; A01K 1/0263; A01K 27/00
USPC ................. 119/856, 850, 792, 907
See application file for complete search history.

(56) References Cited

U.S. PATENT DOCUMENTS

| | | | |
|---|---|---|---|
| 2,464,867 | A | 3/1949 | Johnson |
| 3,768,445 | A | 10/1973 | Sorrels |
| 4,324,204 | A | 4/1982 | Friedman |
| 5,941,199 | A | 8/1999 | Tamura |
| D424,761 | S | 5/2000 | Mortenson |
| 6,637,377 | B2 | 10/2003 | Lobanoff et al. |

(Continued)

FOREIGN PATENT DOCUMENTS

| | | |
|---|---|---|
| EP | 3257370 | 12/2017 |
| JP | 2018153104 | 10/2018 |

OTHER PUBLICATIONS

International Search Report and Written Opinion dated Feb. 23, 2022 for International Patent Application No. PCT/US2022/014737, 6 pages.

*Primary Examiner* — Yvonne R Abbott-Lewis
(74) *Attorney, Agent, or Firm* — Morgan, Lewis & Bockius LLP

(57) ABSTRACT

A reversible pet harness includes a body portion having a first side and a second side and one or more straps coupled to the body portion and configured to secure the body portion to a chest/belly of a pet. An aperture defines an opening that extends through the body portion from the first side to the second side. A ring is positioned in the opening and a central strap extends across the opening and through a center of the ring to moveably couple the ring relative to the body portion. The opening and central strap are configured to allow the ring to extend outwardly at least primarily from the first side of the body portion in a first position and outwardly at least primarily from the second side of the body portion in a second position.

13 Claims, 12 Drawing Sheets

(56) References Cited

U.S. PATENT DOCUMENTS

| | | | |
|---|---|---|---|
| 6,792,894 B1 * | 9/2004 | Donaldson | A01K 27/002 54/54 |
| 7,387,087 B2 | 6/2008 | Lady | |
| D609,408 S | 2/2010 | Labelson et al. | |
| D621,561 S | 8/2010 | Siklosi | |
| D633,257 S | 2/2011 | Trias | |
| 7,886,699 B2 | 2/2011 | Lady | |
| 7,891,322 B2 | 2/2011 | Bennett et al. | |
| 8,166,924 B2 | 5/2012 | Cho | |
| D664,310 S | 7/2012 | Ito | |
| 8,210,131 B2 | 7/2012 | Friedland | |
| 8,261,699 B2 | 9/2012 | Cho | |
| D677,841 S | 3/2013 | Gibbs | |
| D681,287 S | 4/2013 | Collingnon | |
| 8,459,210 B2 | 6/2013 | Cho | |
| D688,011 S | 8/2013 | Gee | |
| 8,627,788 B2 * | 1/2014 | Sebo | A01K 27/002 54/79.2 |
| D739,303 S | 9/2015 | Kinskey | |
| 9,370,166 B1 | 6/2016 | Ford | |
| D764,719 S | 8/2016 | Broder | |
| 9,420,763 B2 * | 8/2016 | Batista | A01K 27/008 |
| 9,578,857 B2 | 2/2017 | Goluboff | |
| 9,655,344 B1 * | 5/2017 | Sebö | A01K 15/02 |
| D791,991 S | 7/2017 | Brauser et al. | |
| D798,508 S | 9/2017 | Yun | |
| D805,261 S | 12/2017 | Yun | |
| 9,936,678 B2 | 4/2018 | Sebo | |
| 10,334,821 B2 | 7/2019 | Yun | |
| D862,002 S * | 10/2019 | Wu | D30/152 |
| D862,004 S | 10/2019 | Yun | |
| D862,803 S * | 10/2019 | Yun | D30/152 |
| D878,684 S | 3/2020 | Zimmermann | |
| D883,581 S | 5/2020 | Daly et al. | |
| D886,395 S | 6/2020 | Han et al. | |
| D888,348 S | 6/2020 | Yun | |
| D893,811 S | 8/2020 | Wu | |
| D905,353 S | 12/2020 | Giesen et al. | |
| 11,102,958 B1 * | 8/2021 | Chang | A01K 27/002 |
| 11,324,201 B1 * | 5/2022 | Benishai | A01K 27/002 |
| 2006/0102102 A1 * | 5/2006 | Bennett | A01K 27/002 119/792 |
| 2007/0266960 A1 * | 11/2007 | Mugford | A01K 27/002 119/792 |
| 2008/0134991 A1 | 6/2008 | Depass | |
| 2008/0223310 A1 * | 9/2008 | Remick | A01K 27/002 119/792 |
| 2010/0116221 A1 | 5/2010 | Falcon-Labry | |
| 2010/0263602 A1 * | 10/2010 | Cho | A01K 27/002 119/792 |
| 2013/0327282 A1 * | 12/2013 | Sebo | A01K 27/006 119/850 |
| 2014/0182520 A1 | 7/2014 | Goluboff | |
| 2018/0184621 A1 | 7/2018 | Trevino | |
| 2019/0373860 A1 | 12/2019 | Kath | |
| 2020/0245592 A1 | 8/2020 | Wagner | |
| 2021/0059216 A1 * | 3/2021 | Guidetti | A01K 27/002 |

\* cited by examiner

REVERSIBLE PET HARNESS HAVING A CHEST RING

CROSS-REFERENCE TO RELATED APPLICATIONS

This application is a Continuation of U.S. patent application Ser. No. 17/215,578 filed Mar. 29, 2021 entitled "Reversible Pet Harness Having a Chest Ring", which claims the benefit of U.S. Provisional Patent Application No. 63/146,938 filed Feb. 8, 2021 entitled "Pet Harness with Reversible Chest Ring", each of which is incorporated by reference herein in its entirety.

CROSS-REFERENCE TO RELATED APPLICATIONS

This application claims the benefit of U.S. Provisional Patent Application No. 63/146,938 filed Feb. 8, 2021 entitled "Pet Harness with Reversible Chest Ring", which is incorporated by reference herein in its entirety.

BACKGROUND OF THE INVENTION

The present invention generally relates to a reversible pet harness having a chest ring and, more particularly, to a reversible pet harness having a repositionable chest ring.

BRIEF SUMMARY OF THE INVENTION

In one embodiment there is a reversible harness for a pet including a body portion having a first side and a second side, one or more straps coupled to the body portion and configured to secure the body portion to a chest of the pet. The reversible harness may include an aperture defining an opening extending through the body portion from the first side to the second side, a ring positioned in the opening and defining a ring opening, and a central strap extending across the opening and through the ring opening of the ring to moveably couple the ring relative to the body portion. The opening and central strap may be configured to allow the ring to extend outwardly at least primarily from the first side of the body portion in a first position and outwardly at least primarily from the second side of the body portion in a second position.

In some embodiments, the ring includes a first portion diametrically opposed to a second portion, the second portion having a radius of curvature which is less than the first portion. In some embodiments, the central strap extends partially along a length of the body portion above and below the aperture. In some embodiments, the central strap is sandwiched between the first side and the second side and extends above and below the aperture. In some embodiments, the reversible pet harness further includes a first reinforced padding coupled to the first side, and a second reinforced padding coupled to the second side. The first reinforced padding and the second reinforced padding may define the aperture.

In some embodiments, the body portion is comprised of a first material and the first reinforced padding and the second reinforced padding are each comprised of a second material which is different from the first material. In some embodiments, a top portion of the central strap is fixedly coupled to the body portion above the aperture. In some embodiments, a bottom portion of the central strap is fixedly coupled to the body portion below the aperture. In some embodiments, the ring is a unitary construct. In some embodiments, the ring is comprised of a plastic material. In some embodiments, the ring is comprised of metal. In some embodiments, the opening and central strap are configured to allow the ring to be moved in a first direction along a first axis and rotated about a second axis such that the ring transitions from the first position to the second position, wherein the second axis is perpendicular to the first axis. In some embodiments, the central strap extends through the ring opening of the ring when the ring is in either of the first or second positions.

In other embodiments, there is a reversible pet harness including a body portion having a first side and a second side, and one or more straps coupled to the body portion and configured to secure the body portion to a chest/belly of a pet. The reversible pet harness may include an aperture defining an opening extending through the body portion from the first side to the second side, and a ring having a first portion coupled to a second portion, the second portion having a radius of curvature which is greater than the first portion, the ring positioned in the opening, the ring defining a ring opening. The reversible pet harness may include a central strap extending across the opening and through the ring opening of the ring to moveably couple the ring relative to the body portion. The central strap may extend partially along a length of the body portion above and below the aperture and be sandwiched between the first side and second side, the opening and central strap configured to allow the ring to extend outwardly at least primarily from the first side of the body portion in a first position and outwardly at least primarily from the second side of the body portion in a second position. The central strap includes a top portion disposed above the aperture and a bottom portion disposed below the aperture, the top portion and bottom portion fixed relative to the body portion.

In some embodiments, the top portion is directly coupled to at least one of the first side and second side. In some embodiments, the body portion is directly coupled to at least one of the first side and second side. In some embodiments, the opening and central strap are configured to allow the ring to be moved in a first direction along a first axis and rotated about a second axis such that the ring transitions from the first position to the second position. In some embodiments, the central strap extends through the center of the ring when the ring is in either of the first or second positions.

BRIEF DESCRIPTION OF THE SEVERAL VIEWS OF THE DRAWINGS

The foregoing summary, as well as the following detailed description of embodiments of the reversible pet harness having a chest ring, will be better understood when read in conjunction with the appended drawings of an exemplary embodiment. It should be understood, however, that the invention is not limited to the precise arrangements and instrumentalities shown.

In the drawings.

DETAILED DESCRIPTION

Figure 1:
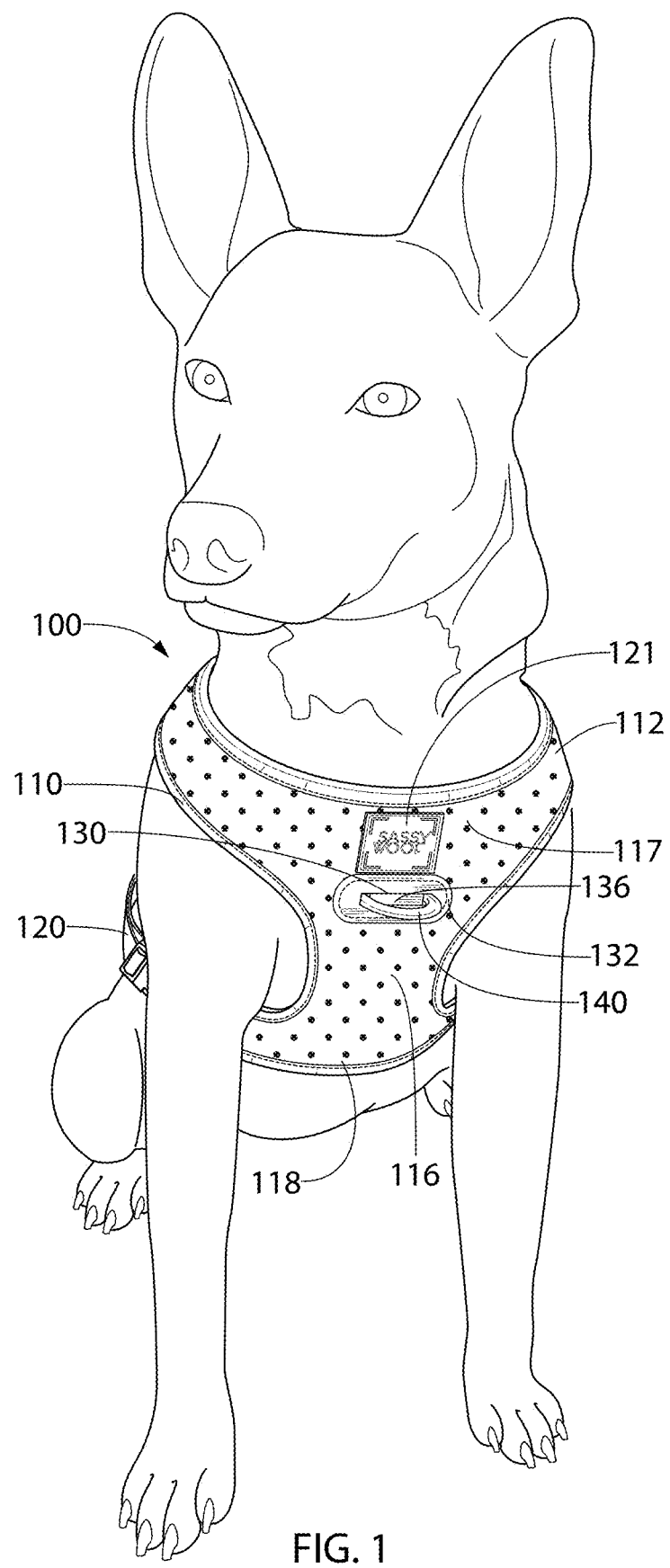
FIG. 1 is a front perspective view of a reversible pet harness having a chest ring in accordance with an exemplary embodiment of the present invention shown in a first configuration on a dog.

There is disclosed herein, embodiments of a reversible pet harnesses having a chest ring configured to be worn by a pet in two or more configurations. The pet harness may be reversible to provide multiple distinct appearances (e.g., two different patterns), and/or different materials (e.g., mesh, netting, fabric) disposed on opposing sides of the pet harness. In some embodiments, the pet harness is reversible such that either a first side or a second side of the pet harness is in direct contact with a pet wearing the harness 100. In some embodiments, the pet harness is reversible to provide hygiene benefits (e.g., a side which has built up dirt or debris may be reversed such that it faces away from the pet/animal wearing the pet harness).

In some embodiments, the pet harness includes a ring disposed on a chest area of the pet harness for receiving a leash, lead, and/or identification tags. In some embodiments, the ring disposed on the chest area of the pet harness may receive a leash and one or more identification tags simultaneously. In some embodiments, the pet harness may be a no-pull type pet harness configured to reduce a pet and/or animal's ability to pull against a leash and/or lead connected to the pet harness. In some embodiments, the ring is configured to be repositioned from one side to another such that ring may receive a leash and/or lead when the pet harness is in either a first or second configuration. In some embodiments, the ring being repositionable may allow for the pet harness to be reversible without the need to provide additional rings disposed on the chest area of the pet harness.

Referring to the drawings in detail, wherein like reference numerals indicate like elements throughout, there is shown in FIGS. 1-12 a reversible pet harness having a repositionable chest ring, generally designated 100, in accordance with an exemplary embodiment of the present invention.

Figure 2:
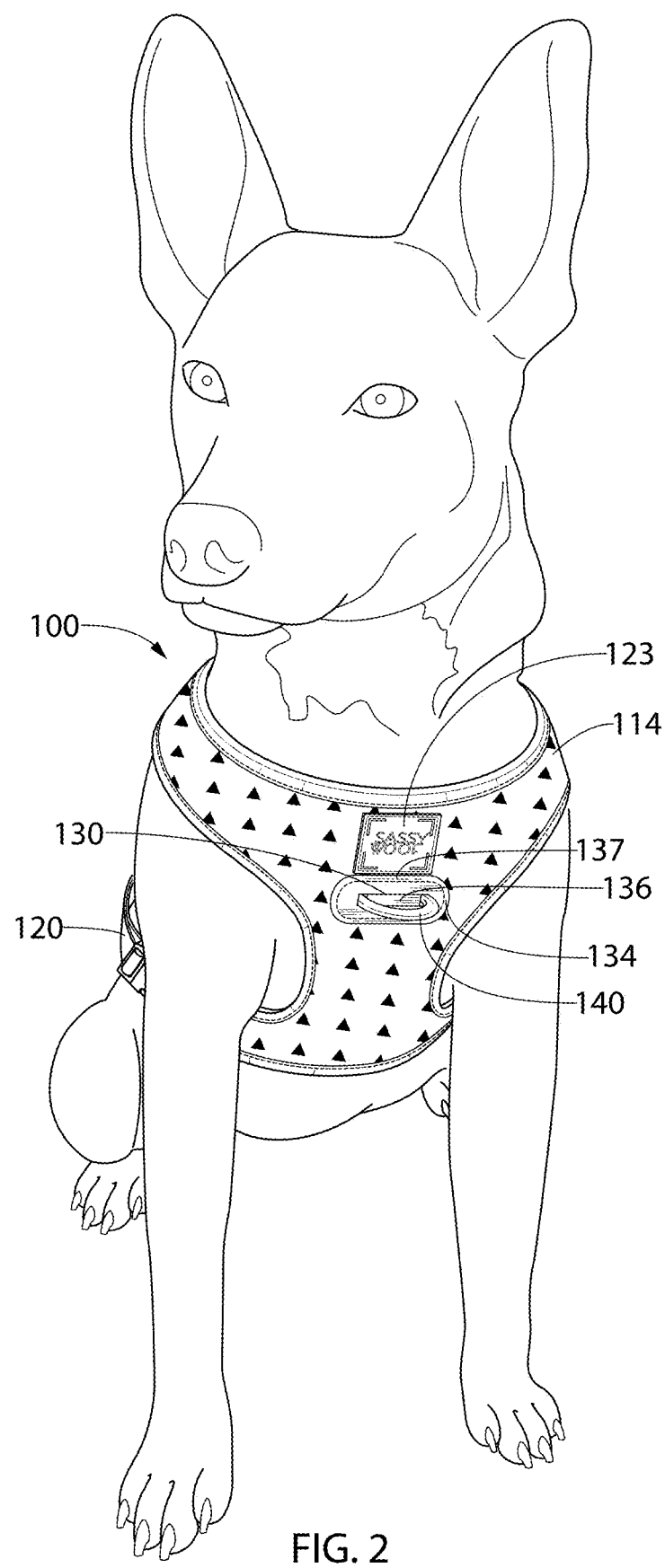
FIG. 2 is a front perspective view of the pet harness of FIG. 1 shown in a second configuration, reversed from the first configuration, on the dog.

Referring to FIGS. 1-2 there is shown a harness 100 configured to be worn by a pet or animal (e.g., cat, dog). The harness 100 may include a padded portion 110, one or more straps 120, and a chest ring 140 configured to receive a leash. The padded portion 110 may have a generally I-shape in a chest area of the padded portion 110, a frusto-conical top portion and a generally T-shaped bottom portion. The padded portion 110 may include a central section 116, a top section 117, and a bottom section 118. In some embodiments, the padded portion 110, when worn by a pet and/or animal, is configured to wrap at least partially around the neck and/or chest of the pet above the pet's front legs (e.g., top section 117), extend along a portion of the pets chest to below the pet's front legs (e.g., central section 116), and extend at least partially around the ribs of the pet above the belly and below the front legs of the pet (e.g., bottom section 118). The central section 116 may extend along a length of the harness 100. The top section 117 may be disposed above the central section 116 and extend along a width of the harness 100. The bottom section 118 may be disposed opposite the top section 117 and extend along a width of the harness 100. In some embodiments, the central section 116, top section 117, and bottom section 118 are a uniform construct. In some embodiments, the one or more straps 120 may be adjustable such that the harness 100 may be worn by pets and/or animals of different size. In some embodiments, the one or more straps 120 are coupled to the padded portion 110. In some embodiments, one or more of straps 120 are detachably coupled to the padded portion 110.

The padded portion 110, may be configured to cover a portion of a pet's chest and/or stomach when worn by the pet. In some embodiments, the central section 116 is configured to extend along a portion of a pet's neck, chest and/or stomach when worn by the pet. In some embodiments, at least a portion of the top section 117 and bottom section 118 are configured to extend from the neck/chest/stomach area of a pet to the pet's sides when the harness 100 is worn by the pet. The padded portion 110 may include a first side 112, and a second side 114 opposite the first side 112. The padded portion 110 may have a thickness defined by the distance between the first side 112 and the second side 114. In some embodiments, the first side 112 may be visually and/or texturally different from the second side 114. In other embodiments, the first side 112 may be visually and/or texturally the same as the second side 114. In some embodiments, the first side 112 includes a fabric. In some embodiments, the fabric may include designs which are printed, adhered to, and/or stitched onto the fabric. In some embodiments, the second side 114 includes a mesh material that is stitched onto the harness 100. In some embodiments, the first side 112 and second side 114 may both include the fabric or mesh material.

Figure 5:
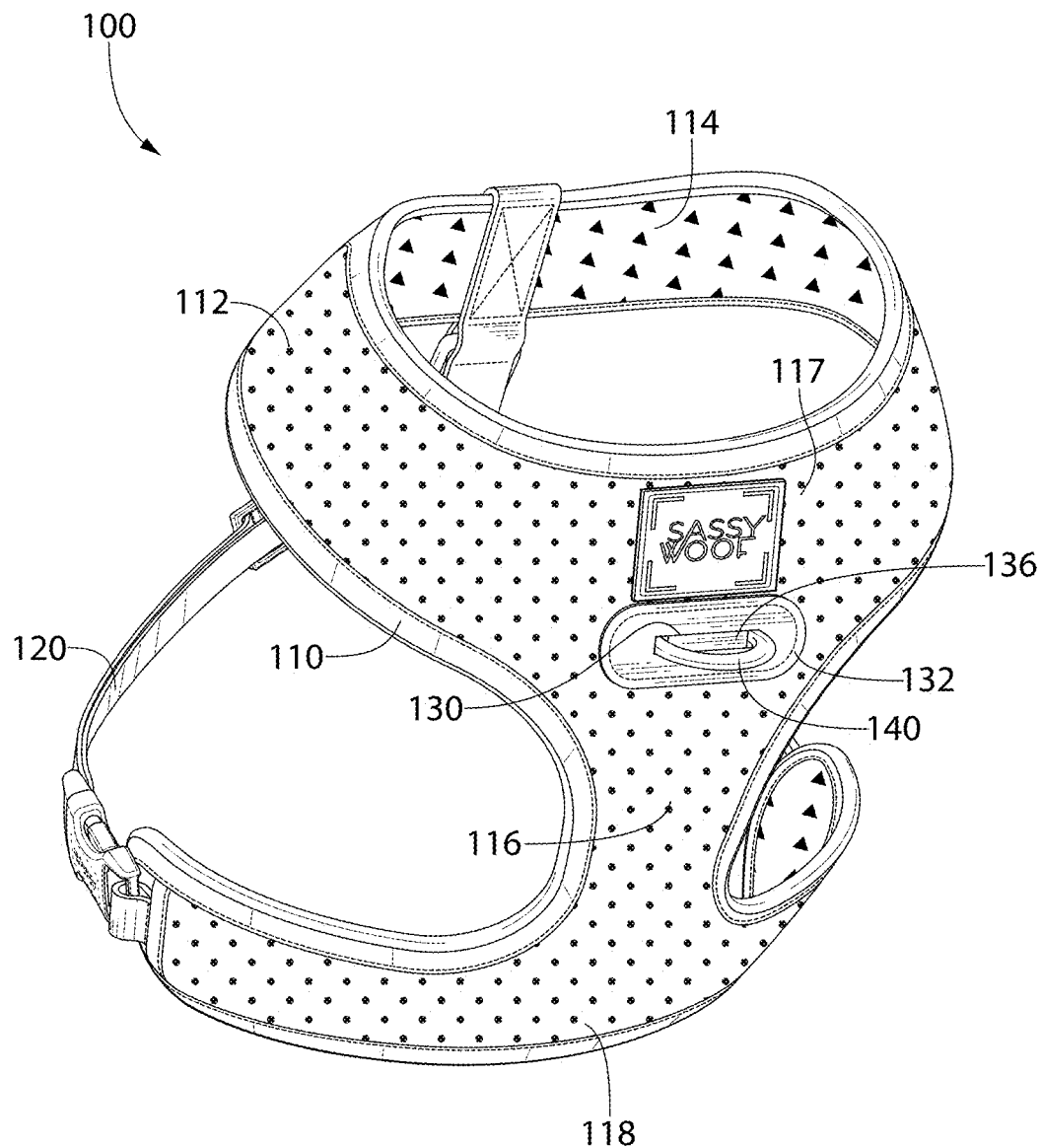
FIG. 5 is a front perspective view of the pet harness of FIG. 1.
Figure 6:
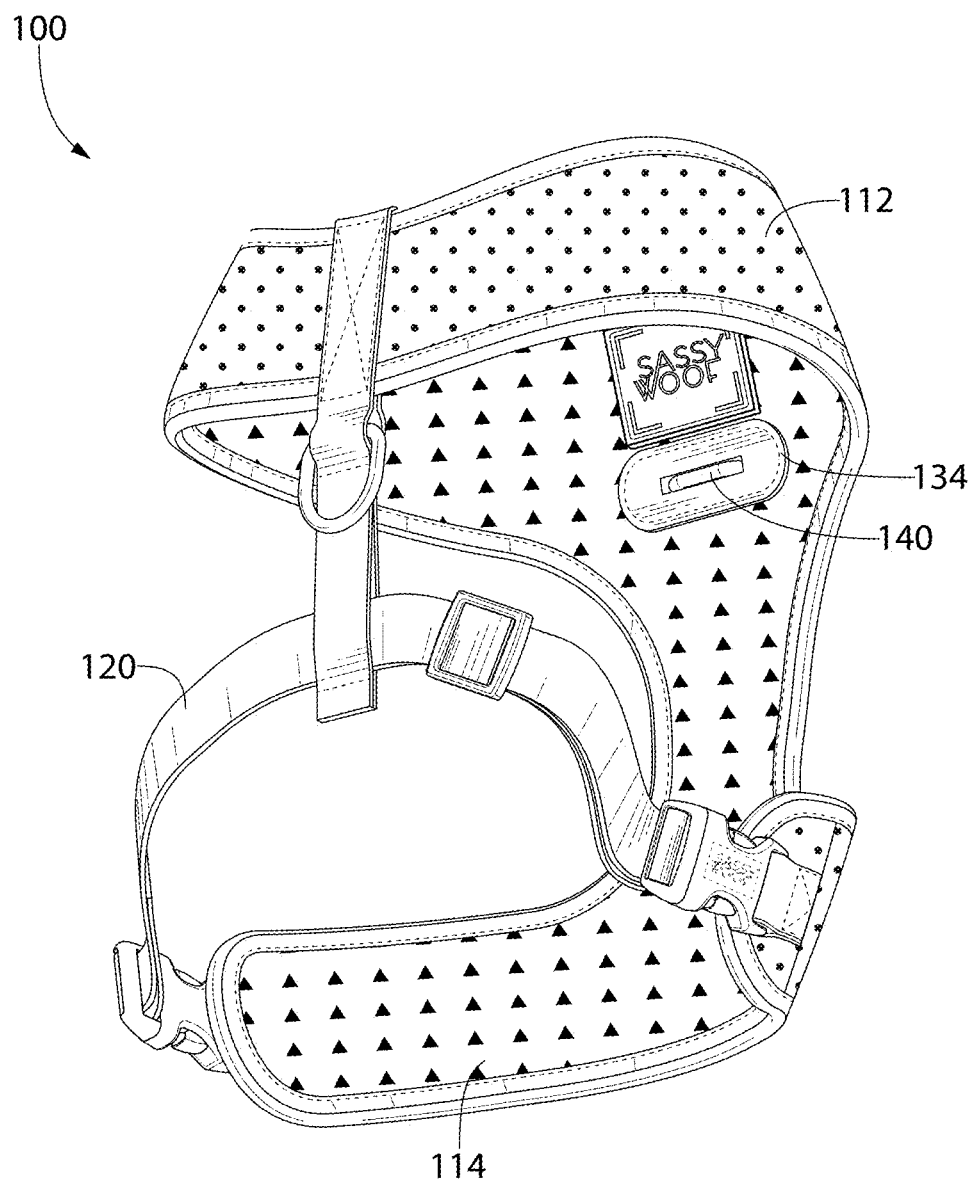
FIG. 6 is a rear perspective view of the pet harness of FIG. 1.

Referring to FIGS. 5-6, in some embodiments, the padded portion 110 may include an opening 130 extending from the first side 112 to the second side 114. In some embodiments, the opening 130 extends through the thickness of the padded portion 110. In some embodiments, the padded portion 110 includes a first reinforced padding 132 and a second reinforced padding 134 defining the opening 130. In some embodiments, the first reinforced padding 132 is directly coupled to the first side 112 of the padded portion 110. In some embodiments, the first reinforced padding 132 is stitched onto the first side 112 of the padded portion 110. In some embodiments, the second reinforced padding 134 is directly coupled to the second side 114 of the padded portion 110. In some embodiments, the second reinforced padding 134 is stitched onto the second side 114 of the padded portion 110. In some embodiments, the reinforced paddings 132, 134 are comprised of a material different from the material the padded portion 110 is comprised of. In some embodiments, the reinforced paddings 132, 134 are comprised of leather, leatherette, faux leather, or any other textile capable of being sewn onto the padded portion 110. In some embodiments, the reinforced paddings 132, 134 each have a generally pill shape (e.g., two rounded sides opposite one another and connected by generally horizontal upper and lower edges). In some embodiments, the reinforced paddings 132, 134 may have a generally square shape, generally rectangular shape, generally circular shape, generally ovular shape, or any other shape.

Figure 3:
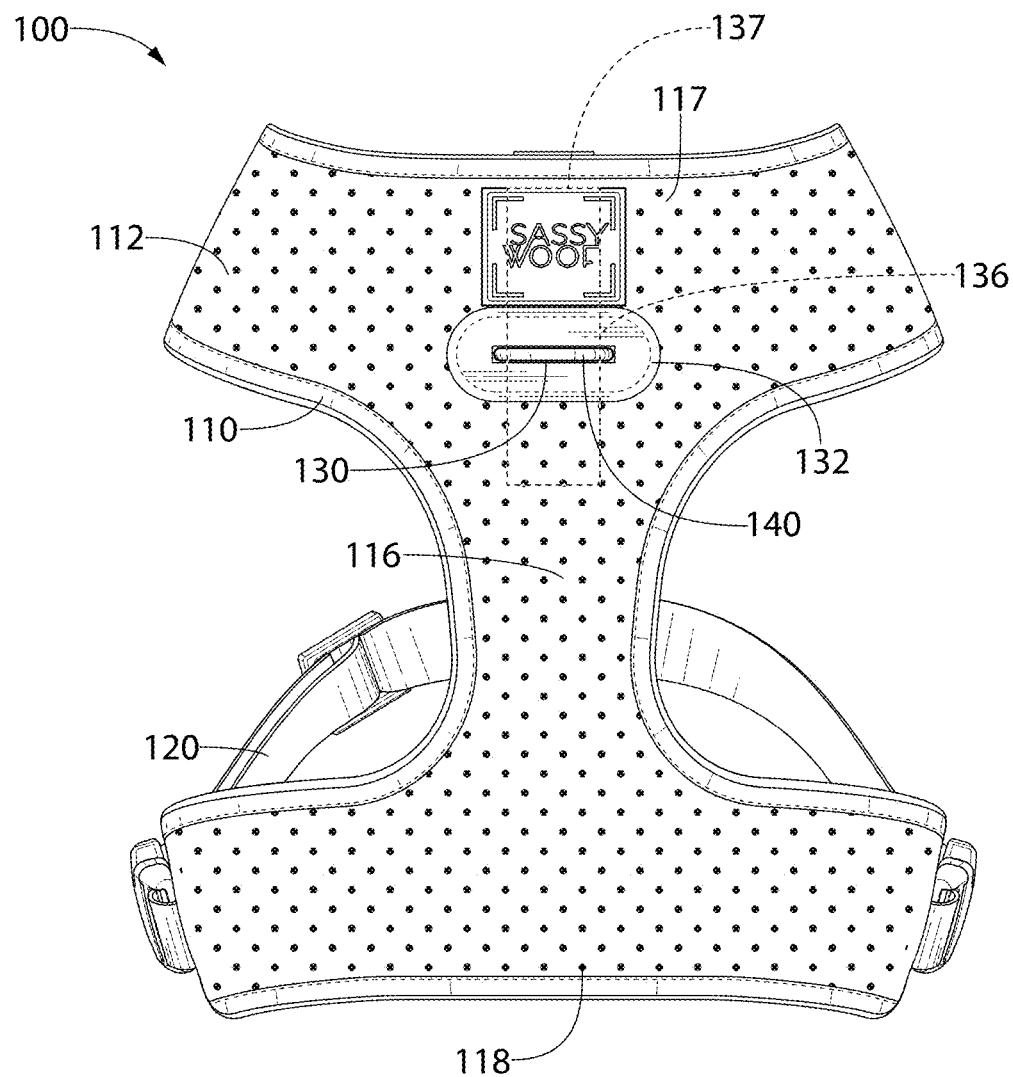
FIG. 3 is a front view of the pet harness of FIG. 1, shown in the first configuration.
Figure 4:
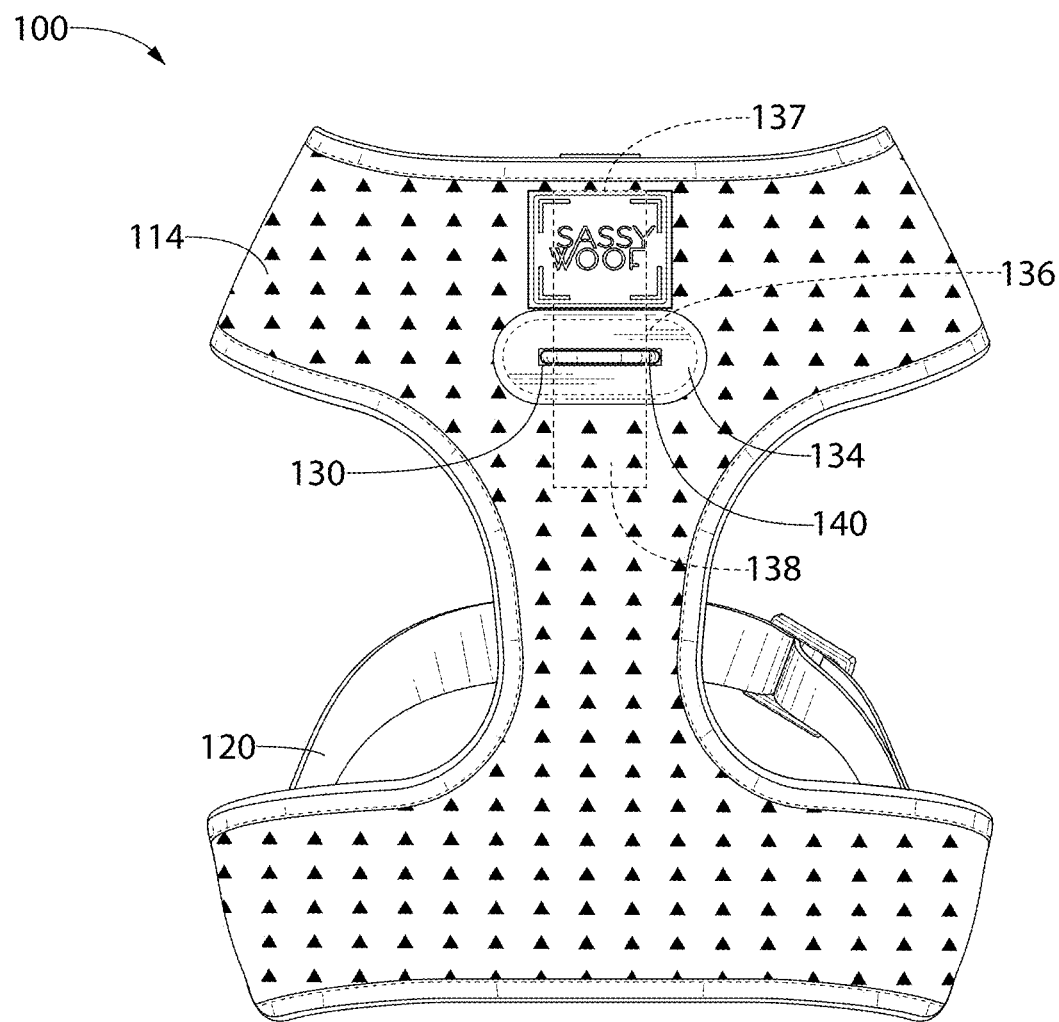
FIG. 4 is a front view of the pet harness of FIG. 1, shown in the second configuration.

Referring to FIGS. 3-4, in some embodiments, the padded portion 110 may include a central strap 136 extending partially along a length of the padded portion 110. In some embodiments, the central strap 136 is disposed between the first side 112, and the second side 114. In some embodiments, the central strap 136 is coupled to one of the first side 112 and second side 114 such that a portion of central strap 136 extends across opening 130. In some embodiments, central strap 136 is comprised of a generally rigid material. In other embodiments, the central strap 136 is comprised at least partially of an elastic material. In some embodiments, the central strap 136 is comprised of a nylon webbing. In some embodiments, the opening 130 is between about 0.5 inches to 1.5 inches wide. In some embodiments the opening 130 is between about 0.125 inches to 0.25 inches tall.

In some embodiments, a portion of the central strap 136 is visible through the opening 130. In some embodiments, the central strap includes a top portion 137 and bottom portion 138 (shown in broken lines in FIG. 4). In some embodiments, the top portion 137 of the central strap 136 is coupled to the padded portion 110. In some embodiments, the bottom portion 138 of the central strap 136 is coupled to the padded portion 110, opposite the top portion 137. In some embodiments, the top portion 137 and bottom portion 138 of the central strap 136 are fixed relative to the padded portion 110. In some embodiments, the top portion 137 and bottom portion 138 are stitched onto the padded portion 110. In some embodiments, the central strap 136 extends above and below the opening 130 and has a width less than the width of the opening 130. In some embodiments, the central strap 136 is positioned within the opening such that opposing sections of the chest ring 140 may pass through the opening. In other embodiments, the central strap 136 may have a width which is the same or larger than the opening 130. In other embodiments, the central strap 136 includes one or more apertures that the chest ring 140 extends through. In other embodiments, the padded portion 110 includes one or more apertures which the chest ring 140 extends through and may or may not include the central strap 136. In some embodiments, the central strap 136 is comprised of a textile such as, but not limited to: polyester, neoprene, or nylon.

In some embodiments, the harness 100 includes one or more rings configured to receive a leash or rope. In some embodiments, the harness 100 includes a chest ring 140 adjustably coupled to the padded portion 110. In some embodiments, the chest ring 140 is a D-Ring. In other embodiments, the chest ring 140 may be any one of: generally circular, generally rectangular, generally square, or generally triangular in shape. In some embodiments, the ring is disposed at least partially within opening 130. In some embodiments, the chest ring 140 includes a second portion having a semi-circular shape, a first portion disposed opposite the second portion, and elongated portions on either side of the second portion connecting the first portion to the second portion. In some embodiments, the elongated sections pass through the opening 130 on opposing sides of the central strap 136. In some embodiments, the second portion, first portion and elongated sections are a unitary construct. In some embodiments, the first portion may be slightly curved.

In some embodiments, the chest ring 140 is comprised of a metal (e.g., steel, aluminum, nickel-plated steel, stainless steel, zinc die cast, brass). In other embodiments, the chest ring 140 is comprised of a plastic. In some embodiments, the chest ring 140 has any one of an outer width of about 15 mm, about 20 mm, about 25 mm, about 30 mm, and about 40 mm. In some embodiments, the chest ring 140 has an inner width of about 10 mm, about 12 mm, about 14 mm, about 16 mm, about 18 mm, about 20 mm, about 22 mm, about 24 mm, about 26 mm, about 28 mm, about 30 mm, about 32 mm, about 34 mm, and about 36 mm. In some embodiments, the chest ring 140 has any one of an outer length of about 15 mm, about 20 mm, about 25 mm, about 30 mm, and about 40 mm. The chest ring 140 has an inner length of about 10 mm, about 12 mm, about 14 mm, about 16 mm, about 18 mm, about 20 mm, about 22 mm, about 24 mm, about 26 mm, about 28 mm, about 30 mm, about 32 mm, about 34 mm, and about 36 mm. In some embodiments, the chest ring 140 has a thickness of about 4.5 mm. In other embodiments, the chest ring 140 has any one of a thickness of about 2.0 mm, 2.5 mm, 3.0 mm. and 4.0 mm.

In some embodiments, the first portion, second portion and elongated portions define a ring opening. In some embodiments, the central strap 136 extends through the chest ring opening to couple the chest ring 140 to the padded portion 110. For example, as shown in FIG. 4, the first portion (e.g., first portion 142 shown in FIG. 12) of the chest ring is disposed on one side of the central strap 136 while the second portion (e.g., second portion 144 shown in FIG. 12) is disposed on the opposite side of the central strap 136. In some embodiments, the chest ring 140 may be repositionable such that the position of the chest ring 140 relative to the central strap 136 transitions from a first position to a second position. In some embodiments, the central strap 136 passing through the opening defined by the chest ring 140 allows the chest ring 140 to be adjusted relative to the central strap 136. For example, the second portion of the chest ring 140 may be adjusted such that the second portion extends outward from the first side 112 while the first portion extends toward the second side 114 and vice versa. In some embodiments, the chest ring 140 is not rigidly coupled to the central strap 136. For example, the chest ring 140 may define an opening located in the center of the chest ring 140. The central strap 136 may pass through the opening located in the center of the chest ring 140, such that the chest ring 140 is coupled to the central strap 136 without any one location along the chest ring 140 being fixed relative to the central strap 136.

In some embodiments, the chest ring 140 may be moved or rotated in three dimensions relative to the central strap 136 while the central strap passes through the opening defined by the chest ring 140. In some embodiments, the central strap 136 may bend and/or stretch partially through opening 130 such that a portion (e.g., first portion 142 shown in FIG. 7) of chest ring 140 is recessed within opening 130. In some embodiments, the chest ring 140 may include a first portion and a second portion. The first portion 142 of the chest ring 140, may be configured to be partially recessed within the opening 130 when the harness is being worn by a pet and/or animal. In some embodiments, the first portion 142 is configured to be generally flush or recessed within an inner surface of the pet harness 100 when the pet harness 100 is worn by a pet. For example, the first portion 142 may be flush with or recessed within the second side 114 when the pet harness 100 is worn by a pet in the configuration shown in FIG. 1. The first portion 142 may be flush with or recessed within the first side 112 when the pet harness 100 is worn by a pet in the configuration shown in FIG. 2. The second portion of the chest ring 140 (e.g., second portion 144 shown in FIG. 7), may be configured to receive a leash and/or lead for directing movement of a pet and/or animal wearing harness 100.

Figure 12:
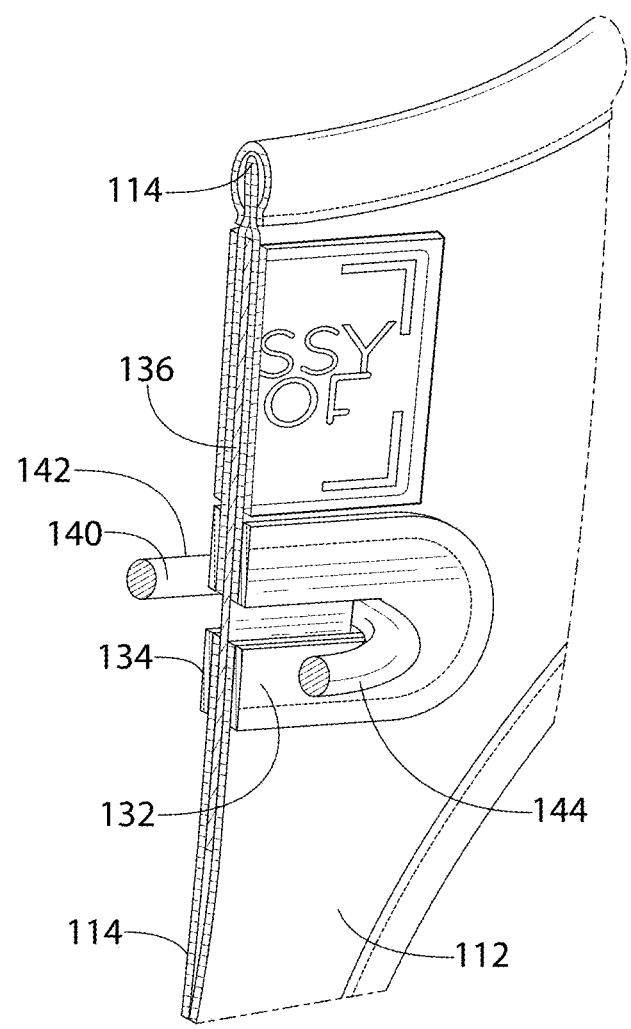
FIG. 12 is a front perspective cross-sectional view of the pet harness of FIG. 1 with the repositionable chest ring in the transitional position shown in FIG. 8.

The chest ring 140 including a first portion and second portion may allow the chest ring 140 to be repositionable between the first configuration and second configuration while still allowing a user to attach a leash and/or lead to the harness (e.g., at the second portion 144) and without causing the chest ring 140 (e.g., at the first portion 142) to abut or be pressed into a pet's skin and/or fur during use. In some embodiments, the chest ring 140 may partially abut or be pressed into a pet's skin and/or fur during use (e.g., an inwardly facing side of a generally circular shaped chest ring may not be recessed or fully recessed into the harness). Referring to FIG. 12, in some embodiments, the first portion 142 may be generally linear in that the first portion 142 extends along a straight or nearly straight axis. In some embodiments, the first portion 142 has a gradual radius of curvature. In some embodiments, the second portion 144 is rounded such that the second portion 144 has a semicircular shape. In some embodiments, the second portion 144 is curved about an axis such that the second portion has a lesser radius of curvature than the first portion 142. In some embodiments, the chest ring 140 coupled to the padded portion 110 in a horizontal configuration, as shown in FIG. 1. In other embodiments, the chest ring 140 is coupled to the padded portion 110 in a vertical configuration (not shown) such that the chest ring 140 and central strap 136 are rotated 90° from the configuration shown in FIG. 1. For example, the chest ring 140 may be rotated 90° to extend vertically along a portion of the length of the padded portion 110 and the central strap 136 may be rotated 90° to extend horizontally along a portion of the width of the padded portion 110.

Figure 7:
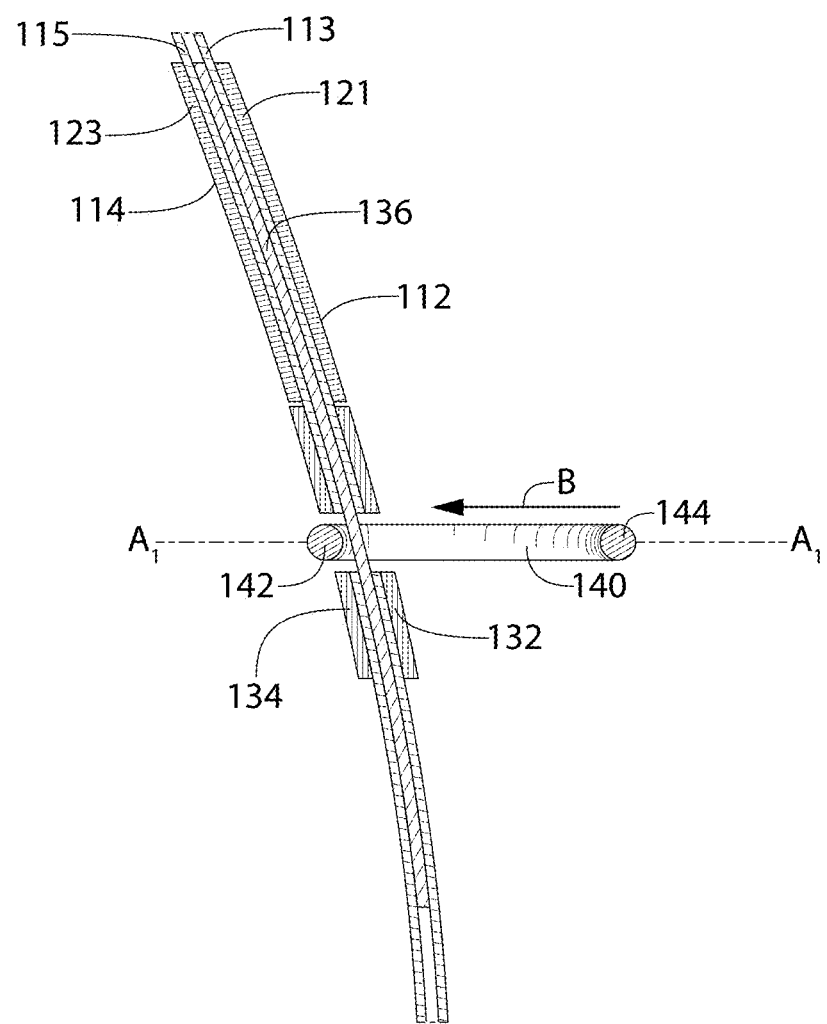
FIGS. 7-11 are side cross-sectional side views of the pet harness of FIG. 1 illustrating a repositionable chest ring transitioning from a first position to a second position.
Figure 8:
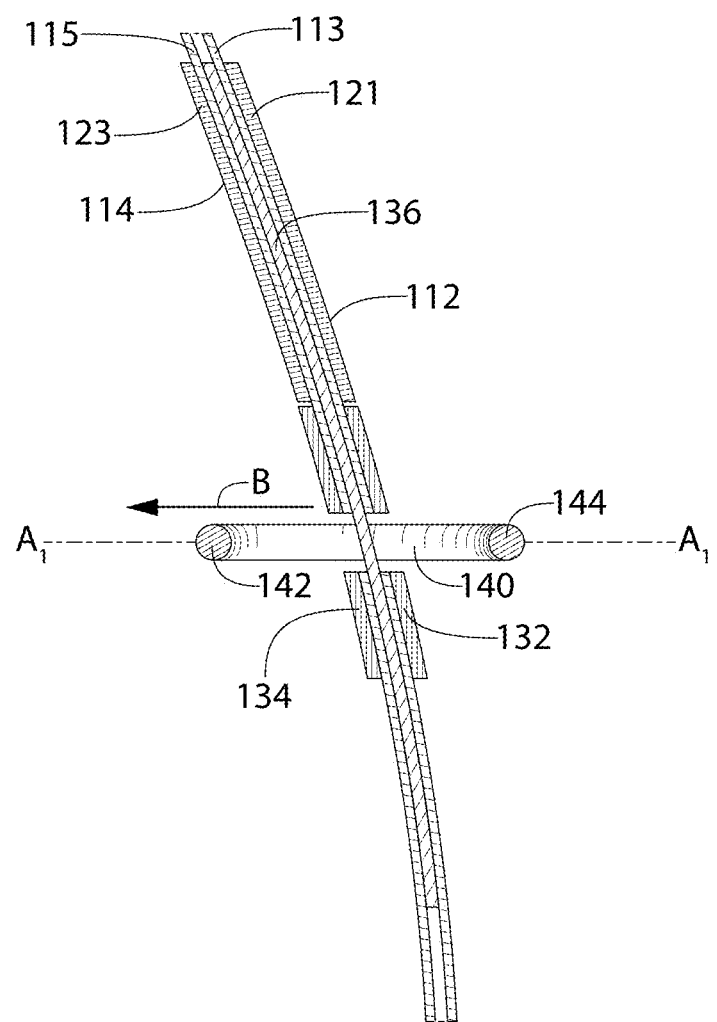
Figure 9:
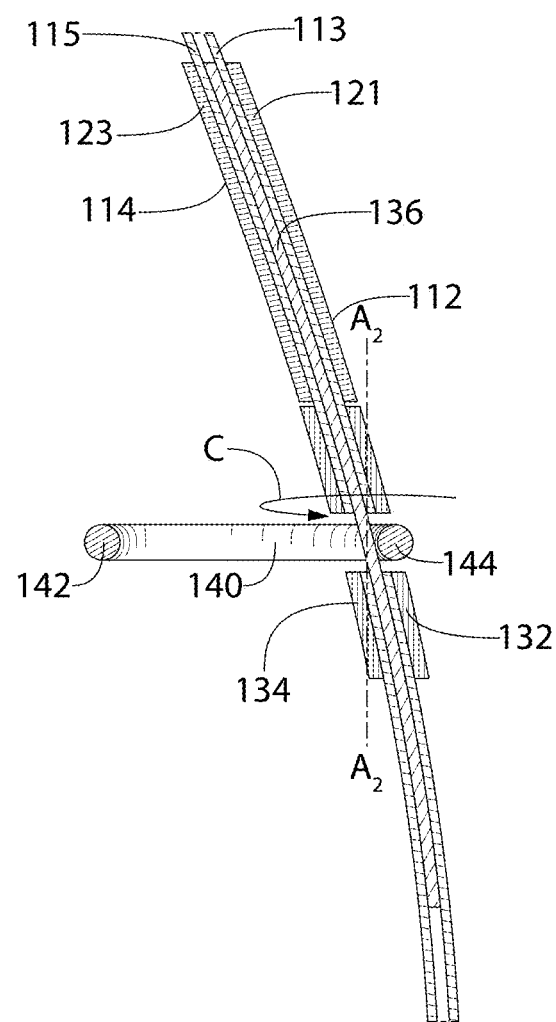

Referring to FIGS. 7-12, there is shown a magnified cross-sectional view of harness 100 depicting an example of the chest ring 140 adjusted between a first position and a second position. The padded portion 110 may include a plurality of layers between the first side 112 and second side 114. The padded portion 110 may include a first label layer 121 and a first fabric layer 113 disposed on the first side 112. The padded portion 110 may include a second label layer 123 and a second fabric layer 115 disposed on the second side 114. The central strap 136 may be sandwiched between the first fabric layer 113 and second fabric layer 115. As shown in FIG. 7, the chest ring 140 is in a first position, wherein the second portion 144 of the chest ring 140 extends outwardly from the first side 112 of padded portion 110. As indicated by arrow B, the second portion 144 of the chest ring 140 may be moved towards the central strap 136, along axis $A_1$, such that the second portion 144 is closer to the central strap 136 than the first portion 142. In some embodiments, a user manually moves the chest ring 140 along axis $A_1$. In other embodiments, the chest ring 140 may be partially moved along Axis $A_1$ and a leash may be attached to the chest ring 140 to pull the chest ring 140 along Axis $A_1$ such that the chest ring 140 extends from an exterior surface of the padded portion 110 (as shown in FIG. 9). In other embodiments, the chest ring 140 may be partially moved along Axis $A_1$ and the pet harness 100 may be coupled to a pet causing the chest of the pet to push the chest ring 140 to extend from an exterior surface of the padded portion 110 (as shown in FIG. 9). As shown in FIG. 8, the chest ring 140 has been moved a first distance along axis $A_1$ in the direction indicated by arrow B such that the first portion 142 has been moved away from second side 114 and the second portion 142 has been moved towards the second side 114. As indicated by arrow B, the second portion 144 of the chest ring 140 may be moved further towards the central strap 136, along axis $A_1$, such that the second portion 144 is moved towards the central strap 136. Referring to FIG. 12, a perspective view of the position of the chest ring 140 in the position shown in FIG. 8 is depicted. As can be seen in the figure, the first portion 142 of the chest ring 140 extends outwardly from the second side 114 while the second portion 144 extends outwardly from the first side 112.

Figure 10:
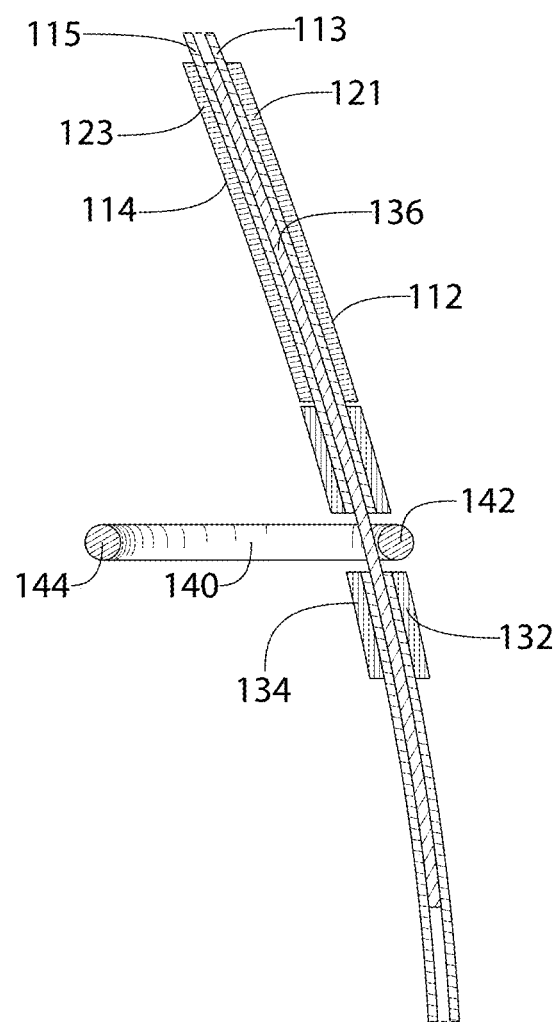
Figure 11:
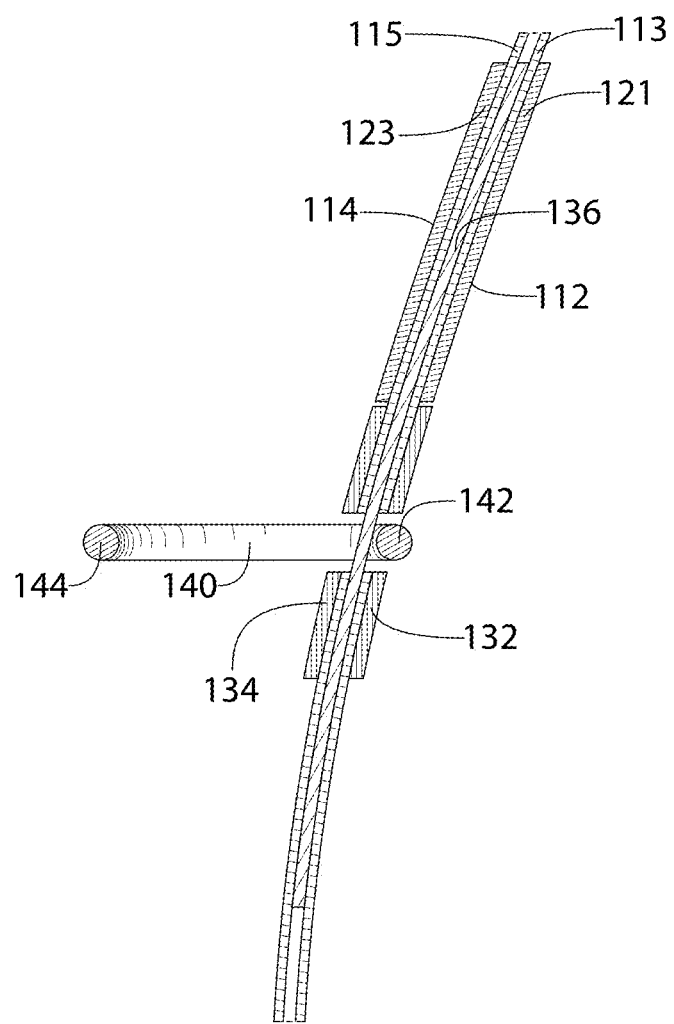

As shown in FIG. 9, the chest ring 140 has been moved such that the second portion 144 is closer to the central strap 136 than the first portion 142. As indicated by arrow C, the chest ring 140 is rotated relative to the central strap 136 such that the first portion 142 of the chest ring 140 faces the first side 112 of the padded portion 110 (as shown in FIG. 10). In some embodiments, the chest ring is rotated by about 180° by a user. As shown in FIG. 10, the chest ring 140 is in the second position, following the movement towards and rotation about the central strap 136. It will be understood that the chest ring 140 may alternatively be rotated relative to the central strap 136 and then moved relative the central strap 136 such as to cause the chest ring 140 to transition from the first position to the second position. In some embodiments, the repositioning of the chest ring 140, as shown in FIGS. 7-10, may take place prior to, during, or after the harness 100 is transitioned between the first configuration, as shown in FIG. 1, and the second configuration, as shown in FIG. 2 (also referred to as being inverted or reversed). In the example shown in FIGS. 7-10, the harness 100 is shown in the same configuration (e.g., the first configuration) throughout, however the harness 100 may be reversed to the other configuration (e.g., the second configuration) at any point before, during, or after the repositioning of the chest ring 140. For example, the harness 100 is transitioned from the first configuration to the second configuration as shown in FIG. 11.

In some embodiments, the chest ring 140 may require one or more of the translations and/or rotations illustrated in FIGS. 7-10 for the chest ring 140 to be repositioned between the first and second positions, depending on the geometry of the chest ring 140. In some embodiments, the chest ring 140 may be a generally circular shaped ring, such as an O-shape ring, which may be repositioned from a first position to a second position in a similar manner as shown in FIGS. 7-8. For example, a chest ring 140 having a generally circular shape may be repositioned between a first position and a second position by translating the chest ring 140 along axis $A_1$ without requiring that the chest ring 140 be rotated about axis $A_2$ as shown in FIG. 9. Similarly, a chest ring 140 having a generally square or rectangular shape may be transitioned between a first position and a second position without requiring rotation about axis $A_2$.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A reversible harness for a pet comprising:
   a body portion having a first side and a second side;
   one or more straps coupled to the body portion and configured to secure the body portion to a chest of the pet;
   an aperture defining an opening extending through the body portion from the first side to the second side;
   a ring positioned in the opening and defining a ring opening; and
   a central strap extending across the opening and through the ring opening of the ring to moveably couple the ring relative to the body portion, the opening and central strap configured to allow the ring to extend outwardly at least primarily from the first side of the body portion in a first position and outwardly at least primarily from the second side of the body portion in a second position.

2. The reversible harness of claim 1, wherein the ring includes a first portion diametrically opposed to a second portion, the second portion having a radius of curvature which is greater than the first portion.

3. The reversible harness of claim 1, wherein the central strap extends partially along a length of the body portion above and below the aperture.

4. The reversible harness of claim 1, wherein the central strap is sandwiched between the first side and the second side and extends above and below the aperture.

5. The reversible harness of claim 1 further comprising:
   a first reinforced padding coupled to the first side; and
   a second reinforced padding coupled to the second side, wherein the first reinforced padding and the second reinforced padding define the aperture.

6. The reversible harness of claim 5, wherein the body portion is comprised of a first material and the first reinforced padding and the second reinforced padding are each comprised of a second material which is different from the first material.

7. The reversible harness of claim 1, wherein a top portion of the central strap is fixedly coupled to the body portion above the aperture.

8. The reversible harness of claim 1, wherein a bottom portion of the central strap is fixedly coupled to the body portion below the aperture.

9. The reversible harness of claim 1, wherein the ring is a unitary construct.

10. The reversible harness of claim 1, wherein the ring is comprised of a plastic material.

11. The reversible harness of claim 1, wherein the ring is comprised of metal.

12. The reversible harness of claim 1, wherein the opening and central strap are configured to allow the ring to be moved in a first direction along a first axis and rotated about a second axis such that the ring transitions from the first position to the second position, wherein the second axis is perpendicular to the first axis.

13. The reversible harness of claim 1, wherein the central strap extends through the ring opening of the ring when the ring is in either of the first or second positions.

* * * * *